(12) United States Patent
Rovik et al.

(10) Patent No.: US 8,941,463 B2
(45) Date of Patent: Jan. 27, 2015

(54) ELECTRIC VEHICLE RESERVE CHARGE AUTHORIZATION AND DISTRIBUTION

(75) Inventors: Christopher L. Rovik, Canton, MI (US); Donald A. Restauri, III, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 115 days.

(21) Appl. No.: 13/425,318

(22) Filed: Mar. 20, 2012

(65) Prior Publication Data
US 2013/0249276 A1 Sep. 26, 2013

(51) Int. Cl.
*H04Q 9/00* (2006.01)

(52) U.S. Cl.
USPC ......... 340/5.2; 340/1.1; 340/5.1; 340/426.13; 340/455; 340/445; 701/22; 701/29.1; 320/127; 320/135

(58) Field of Classification Search
USPC .............. 340/5.2, 426.13, 455, 445; 320/127, 320/135; 701/22, 29.1
See application file for complete search history.

(56) References Cited

U.S. PATENT DOCUMENTS

| | | | |
|---|---|---|---|
| 4,560,937 A | 12/1985 | Finger | |
| 5,316,868 A | 5/1994 | Dougherty et al. | |
| 5,352,982 A * | 10/1994 | Nakazawa et al. | 324/427 |
| 5,596,262 A * | 1/1997 | Boll | 340/636.12 |
| 5,931,245 A | 8/1999 | Uetake et al. | |
| 6,384,573 B1 | 5/2002 | Dunn | |
| 6,850,153 B1 * | 2/2005 | Murakami et al. | 340/425.5 |
| 7,400,113 B2 | 7/2008 | Osborne | |
| 7,567,057 B2 | 7/2009 | Elder et al. | |
| 7,688,074 B2 | 3/2010 | Cox et al. | |
| 7,834,583 B2 | 11/2010 | Elder et al. | |
| 2005/0206509 A1 * | 9/2005 | Becker et al. | 340/426.19 |
| 2005/0266301 A1 * | 12/2005 | Smith et al. | 429/61 |
| 2010/0083008 A1 * | 4/2010 | Jakes et al. | 713/300 |
| 2010/0213948 A1 | 8/2010 | Bauer et al. | |
| 2011/0018503 A1 * | 1/2011 | Patino et al. | 320/162 |
| 2011/0032110 A1 * | 2/2011 | Taguchi | 340/636.1 |

(Continued)

FOREIGN PATENT DOCUMENTS

WO    WO 2010/131262    11/2010

OTHER PUBLICATIONS

REVA to Launch Two Plug-Ins with Proprietary Technology (Bhavesh) Jan. 31, 2012.

*Primary Examiner* — George Bugg
*Assistant Examiner* — Naomi Small
(74) *Attorney, Agent, or Firm* — Snell & Wilmer LLP

(57) ABSTRACT

A system for an electric vehicle for authorizing the utilization of a reserve charge portion of a battery of the electric vehicle for powering the electric vehicle. The authorization system may include a remote device that communicates with the electric vehicle via a telematic link. Upon receipt of one or more data from the electric vehicle (e.g., reserve charge amount of the battery, recharge locations, warranty waiver information, billing information, previous authorization information, etc.) the remote device transmits an authorization signal to the electric vehicle for using at least part of the reserve charge portion of the battery based upon the data. The authorization system may incorporate live personnel for determining whether to authorize the electric vehicle or such authorization may be determined automatically by a processor of the remote device. The authorization system may be entirely local to the electric vehicle such that no remote device is needed.

20 Claims, 7 Drawing Sheets

(56) References Cited

U.S. PATENT DOCUMENTS

| | | |
|---|---|---|
| 2011/0082621 A1 | 4/2011 | Berkobin et al. |
| 2011/0084665 A1 | 4/2011 | White et al. |
| 2011/0202218 A1 | 8/2011 | Yano |
| 2011/0221400 A1* | 9/2011 | Takizawa et al. ............. 320/166 |
| 2011/0276448 A1* | 11/2011 | Perper et al. .................... 705/34 |
| 2012/0116606 A1* | 5/2012 | Ichinokawa .................... 701/1 |
| 2012/0157083 A1* | 6/2012 | Otterson .................... 455/422.1 |
| 2012/0158227 A1* | 6/2012 | Tate et al. ........................ 701/22 |
| 2012/0166012 A1* | 6/2012 | Lee et al. ...................... 700/297 |
| 2012/0221878 A1* | 8/2012 | Pocklington et al. ......... 713/340 |

* cited by examiner

ELECTRIC VEHICLE RESERVE CHARGE AUTHORIZATION AND DISTRIBUTION

BACKGROUND

1. Field

The present invention relates generally to improvements in vehicle driving range systems and more particularly pertains to authorization systems for extending the usual driving range of an electric vehicle.

2. Description of the Related Art

Electric vehicles are becoming increasingly popular among consumers concerned with their environmental impact. Electric vehicles help reduce the carbon footprint of an individual by lessening or eliminating the creation of toxic byproducts normally generated when operating a standard automobile utilizing an internal combustion engine. Unfortunately, driving range anxiety for users of these vehicles remains a significant concern due to the vehicle's utilization of a less prevalent fuel recharging source. Although gasoline refueling stations for internal combustion engine automobiles are commonly situated in almost every geographic location and can often be found in relatively close proximity to one another, refueling stations for alternative fuel sources are much less established. Users of electric vehicles must often plan their specific driving route in advance for fear of running out of energy and becoming stranded with no opportunity to refuel or recharge the vehicle. This dilemma can be particularly problematic in areas of lower population density where alternative refueling stations are even scarcer.

While electric vehicles commonly incorporate a range display within the cockpit or dashboard for indicating to a driver the remaining energy or mileage available based on the amount of charge of the battery, this feature alone does little to assuage driving range anxiety for most users. Due to the rarity of electric vehicle recharging stations, a driver may not be capable of reaching the nearest refueling system even if notified by the automobile that the battery charge is low. Particularly when traveling in unfamiliar geographic locations, the threat of becoming stranded proves to be a source of high stress. Additional warnings in the vehicle, such as blinking lights or audible notification tones, also do not adequately resolve the problem and, in fact, often exacerbate an already tensioned situation for the driver. While electric vehicle batteries commonly include a reserve charge portion for helping maintain consistent driving range for the vehicle despite aging of the battery, this reserve charge portion is not accessible by the vehicle for powering the vehicle. The reserve charge portion exists merely as a buffer against diminishing maximum charge for the battery as the battery ages or for optimal battery discharging or recharging performance.

Recently, vehicles have begun incorporating communication functions between the vehicle and remote individuals via telematics systems. These systems have been used by drivers to notify the remote personnel that a vehicle accident has occurred, to request medical attention, to ask for driving directions, to inquire about nearby points of interest, or for a variety of other consumer service needs. Telematic communications are also used for requesting in-person assistance when required, for example, when an automobile has a mechanical or electrical malfunction and is not able to operate correctly. By requesting tow trucks or the provision of small amounts of gasoline, vehicles that have run out of energy may be permitted to travel to an area where they may refuel or otherwise recharge. However, the user is forced to wait in their stranded vehicle until the assistance personnel arrive at their location. Thus, a more efficient and less stressful or disadvantageous manner of preventing a user of an electric vehicle from becoming stranded is desired.

SUMMARY

The present invention may provide an authorization system for an electric vehicle's utilization of battery reserve charge energy. In one embodiment, the present invention may provide a method for authorizing use of reserve charge of a battery of an electric vehicle including using a processor for establishing a telematic link with a remote device of the electric vehicle, receiving, using the telematic link, a charge amount of the reserve charge of the battery and a location of the electric vehicle, and transmitting, using the telematic link, an authorization signal to the remote device of the electric vehicle for authorizing use of at least a portion of the reserve charge of the battery for powering the electric vehicle.

In another embodiment, the present invention may provide a method for accessing reserve charge of a battery of an electric vehicle including initiating, using a processor connected to the battery of the electric vehicle, a telematic link with a remote device, transmitting a reserve charge level of the battery to the remote device over the telematic link, transmitting a location of the electric vehicle to the remote device over the telematic link, and receiving an authorization signal from the remote device over the telematic link for authorizing use of at least a portion of the reserve charge of the battery for powering the electric vehicle.

In yet another embodiment, the present invention may provide a system for accessing reserve charge of an electric vehicle including a rechargeable battery coupled to the electric vehicle, the battery configured to have a reserve charge portion. A processor is coupled to the battery and configured to determine a charge amount of the reserve charge portion of the battery and determine a geographic location of the electric vehicle. At least one antenna is coupled to the processor, the at least one antenna being configured to transmit the charge amount and the geographic location to a remote device and receive an authorization signal from the remote device for authorizing at least part of the reserve charge portion of the battery to provide power to the electric vehicle.

BRIEF DESCRIPTION OF THE DRAWINGS

Other systems, methods, features, and advantages of the present invention will be or will become apparent to one with skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1:
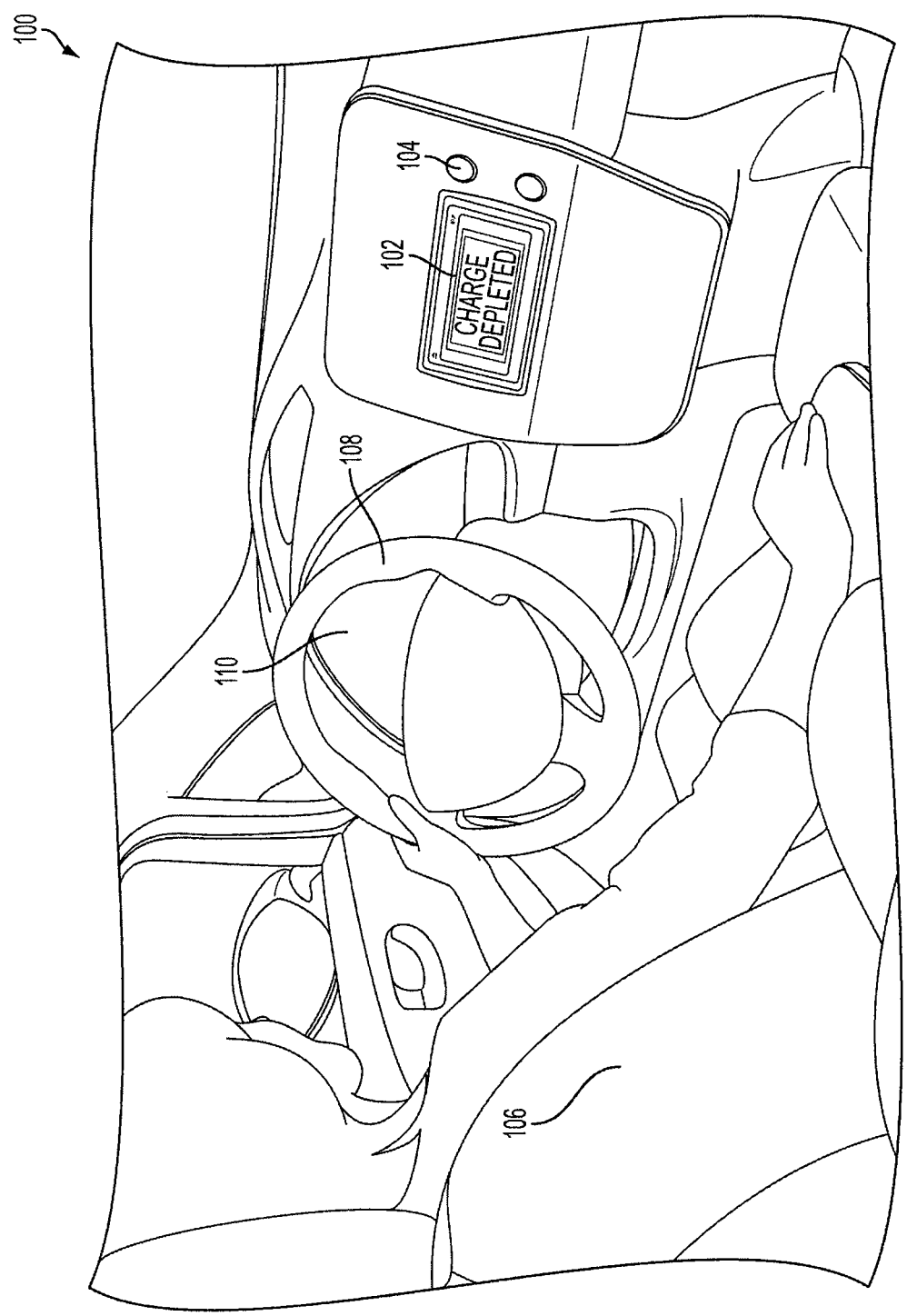
FIG. 1 is a perspective view of an interior of a vehicle having a reserve charge authorization system, according to an embodiment of the present invention.

Referring to FIG. 1, the interior 100 of an electric vehicle is shown and includes a driver seat 106 and a steering wheel 108. A display system for displaying various information or notifications to a user or driver of the electric vehicle is provided in the interior 100 and includes a display 102 and associated user input devices or controls 104. The display system is included as part of the center dash or console of the interior 100 of the vehicle. During operation, the display system allows a user of the vehicle to glance at the display 102 in order to easily be notified of information about the electric vehicle, for example, the charge level of a battery that provides power for the electric vehicle. In another embodiment, the charge level of the battery may also or alternatively be displayed in other locations of the interior 100 of the electric vehicle, for example on the dashboard 110 behind the steering wheel 108.

The display system may coordinate with a remote device or system that performs a variety of customer service functions. Communicating with the remote device or system may allow a user seated in the driver seat 106 or other area within the interior 100 of the electric vehicle to interface with either a customer service representative or an automated system at a remote location. As described in greater detail herein, the remote device or system may be configured to authorize the electric vehicle to obtain power from a reserve charge portion of the battery. The display 102 can aid in such communication with the remote device or system, for example by providing menu options that a user of the electric vehicle may select amongst by using the user input devices or controls 104. By manipulating or otherwise interfacing with the user input devices or controls 104, a user may thus transmit desired communications to the remote device or system, as described in greater detail herein. The user input devices or controls 104 may be buttons, knobs, switches, microphones, or any other type of user interfacing device. In certain embodiments, the user may be able to verbally communicate with individuals at the remote device or system by speaking aloud within the interior 100 of the vehicle.

Figure 2A:
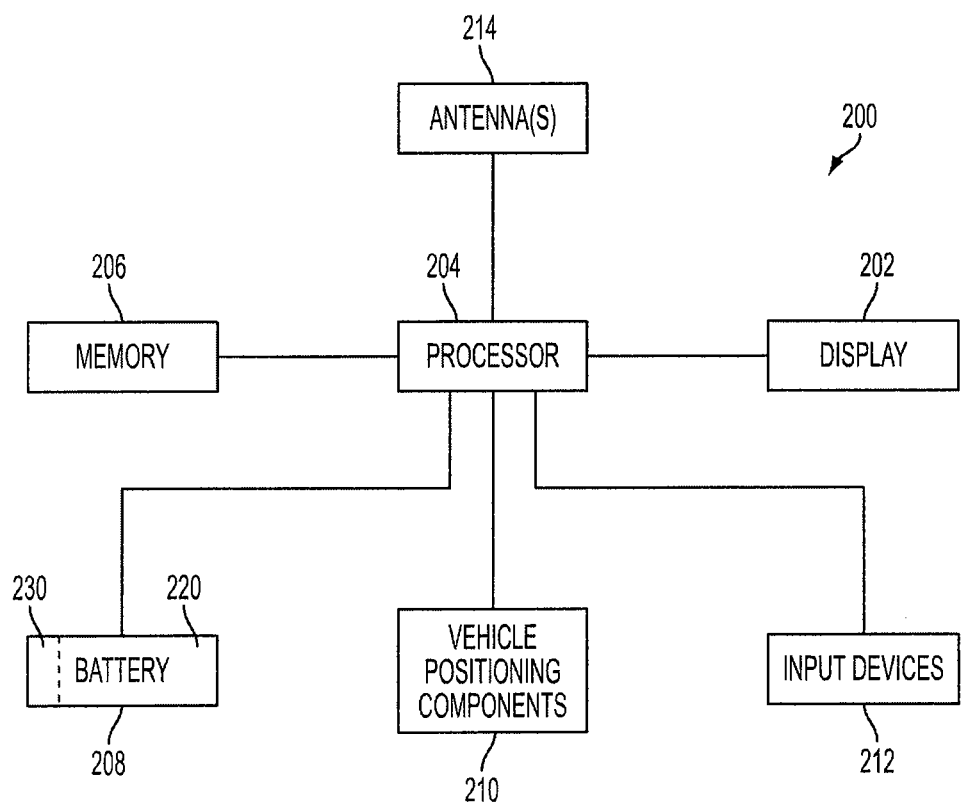
FIG. 2A is a block diagram of various components incorporating a reserve charge authorization system for inclusion on an electric vehicle, according to an embodiment of the present invention.

Referring next to FIG. 2A, a block diagram 200 shows various components incorporating a reserve charge authorization system for inclusion on an electric vehicle, according to an embodiment of the present invention. A display 202 for displaying or communicating information either about the electric vehicle itself or in coordination with a remote device or system operating with the reserve charge authorization system is connected to a processor 204. The processor 204 performs the processing operations or functions for determining various operational aspects of the electric vehicle. In addition, the processor 204 also performs or operates to facilitate remote communication with the remote device or system that is operating with the reserve charge authorization system.

The processor 204 is connected to a memory 206 that may store certain of the logical steps of the reserve charge authorization system. The memory 206 may also store other data used as part of the reserve charge authorization system, for example, battery reserve charge thresholds, a number of previous authorizations, etc., as described in greater detail herein. In addition, the processor 204 also interfaces with a battery 208 of the electric vehicle, vehicle positioning components 210 and any other desired input devices 212. The battery 208 of the electric vehicle has a charge portion 220 configured to power the electric vehicle, the charge level or amount of the charge portion 220 thus diminishing over time between recharging as the electric vehicle uses the battery for power.

The battery 208 of the electric vehicle also has a reserve charge portion 230 that is not normally used to power the electric vehicle. This reserve charge portion 230 of the battery 208 may be a part of the battery 208 that is typically isolated from use by the electric vehicle and aids in accounting for the loss of a maximum charge capability as the battery 208 ages. For example, an electric vehicle may have a predetermined driving range for the battery 208 at maximum charge capability. As the battery ages and through its use in powering the electric vehicle, the maximum charge capability of the battery 208 diminishes. Without the reserve charge portion 230, this drop in maximum charge capability would be apparent to a user of the electric vehicle in the form of a diminished driving range. However, by isolating a portion of the battery charge as reserve charge, this drop in maximum charge capability may be accommodated by the reserve charge portion 230 and effectively hidden from the user. The quantity of reserve charge allocated for the battery 208 may be selected so as to the same as or greater than any expected drop in maximum charge capability over the useable life of the battery 208. Thus, while a battery 208 may have a lower maximum charge capability after years of use, this drop in maximum charge capability is not apparent to a user of the electric vehicle.

The charge amount or level of the reserve charge portion 230 of the battery 208 may be input to or calculated by the processor 204 for determining an available driving range of the electric vehicle given the current charge amount or level of the reserve charge portion 230. The processor 204 may be connected directly to the battery for determining the amount of charge, or the processor 204 may be coupled to the battery 208 through one or more other devices or components (such as a sensor). The vehicle positioning components 210 may be part of a navigation or GPS system of the vehicle that is configured to pinpoint the geographic location of the vehicle. The one or more input devices 212 may be any form of user-interfaceable control, such as buttons, knobs, dials, touch-screens, microphones, etc. These input devices 212 allow a user to interface with the processor 204 and thus interact with the reserve charge authorization system, for example, by initiating a communications link with a remote device or system or communicating with the remote device or system after a communications link is established. One or more antennas 214 are connected to the processor for facilitating the communications with the remote device or system.

Figure 2B:
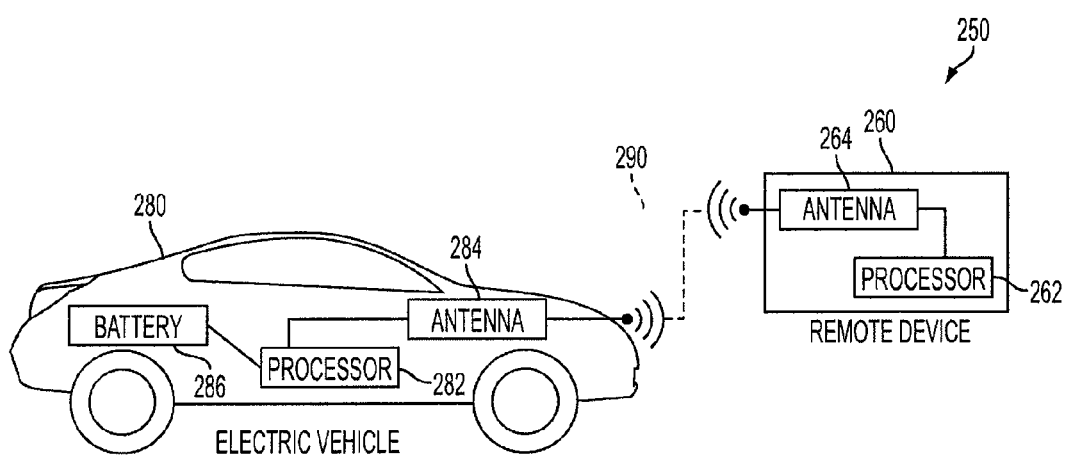
FIG. 2B is a diagram of communication between an electric vehicle and a remote device or system, according to an embodiment of the present invention.

FIG. 2B shows a diagram 250 of communications between an electric vehicle 280 and a remote device 260, according to an embodiment of the present invention. The electric vehicle 280 includes a processor 282 coupled to a battery 286. The processor 282 is also connected with an antenna 284. The remote device 260 also includes a processor 262 connected with an antenna 264. The antenna 284 of the electric vehicle 280 and the antenna 264 of the remote device 260 are configured to establish a telematic or communications link 290 with one another to allow for the transmittal or reception of signals between the electric vehicle 280 and the remote device 260. In an alternative embodiment, multiple antennas may be used in either or both of the electric vehicle 280 or the remote device 260 (e.g., one antenna for transmission and a second antenna for reception). Thus, the telematic link 290 may be a bi-directional communications link or may embody multiple uni-directional communications links.

A user of the electric vehicle 280 may interface with an input device (for example, input devices 212 of FIG. 2A) to initiate the creation of the telematic link 290. The remote device 260 responds to such initiation to establish the telematics link. In an alternative embodiment, the electric vehicle 280 may automatically initiate the telematic link 290 with the remote device 260, for example, when the battery 286 of the electric vehicle 280 runs out of charge normally used for powering the electric vehicle 280. In still another embodiment, the remote device 260 may initiate the telematic link 290 with the electric vehicle 280.

Turning next to FIGS. 3-6, various logic flowcharts for reserve charge authorization systems are shown, according to embodiments of the present invention. The reserve charge authorization systems described, or any alternative embodiments thereof, may utilize a processor on an electric vehicle, for example, the processor 204 discussed above for FIG. 2A, for performing or processing all or some of the steps described herein. The processor may be any type of hardware or circuit capable of performing the method steps described, for example, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In addition, the reserve charge authorization systems may incorporate a memory on the electric vehicle, for example the memory 206 discussed above for FIG. 2A, connected with the processor or embedded as part of the processor. The memory may be used for storing various information or data used in the determinative or authorization processes, as discussed in greater detail below. For example, the memory may be used for storing geographic data, such as maps, addresses, and/or charging location data. In another example, the memory may be used for storing an authorized reserve charge threshold for utilization by a processor in determining a quantity or percentage of reserve charge to be made available for powering the electric vehicle.

Figure 3:
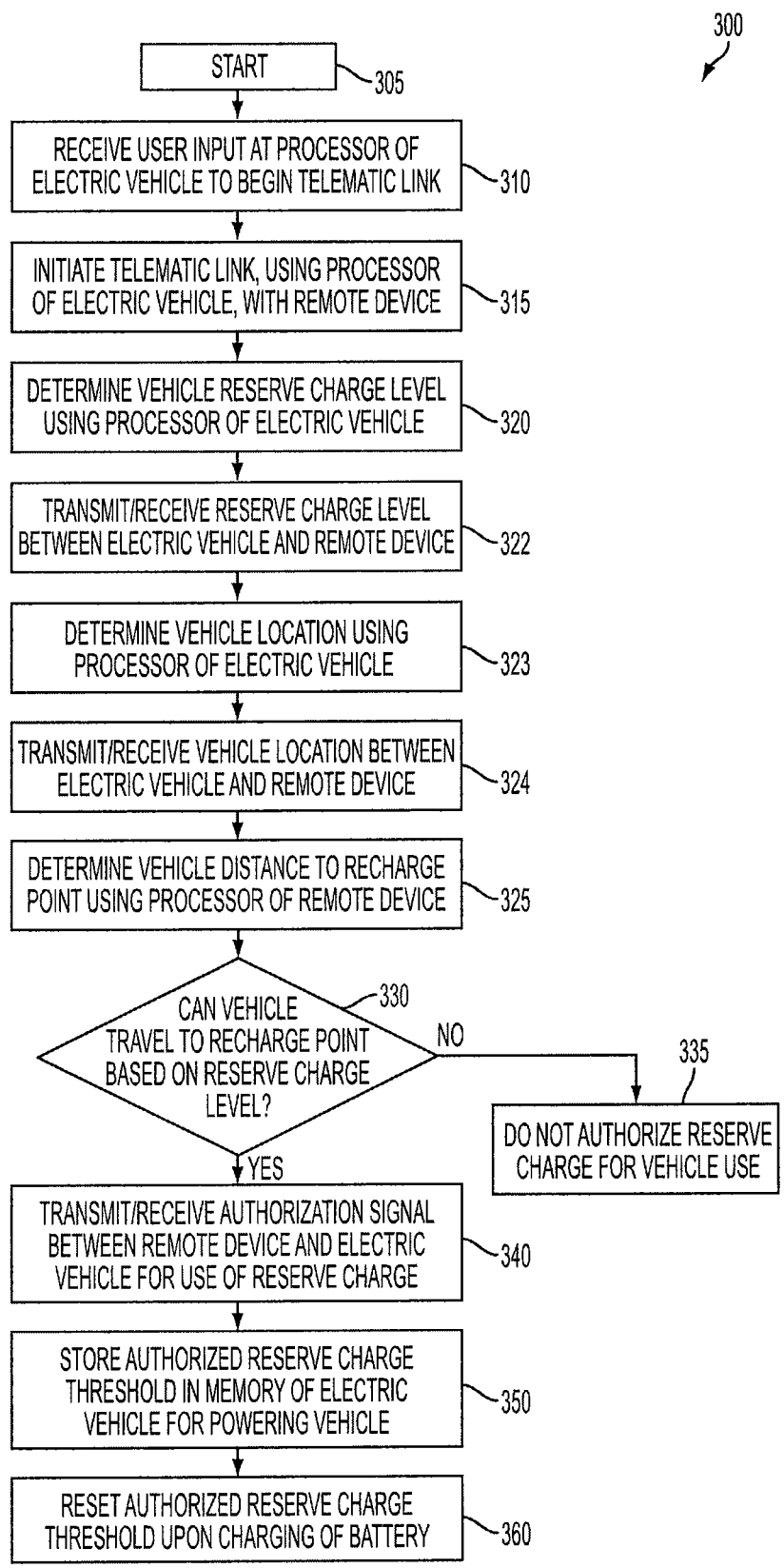
FIG. 3 is a logic flowchart for a reserve charge authorization system utilizing determination of a distance to a recharge point, according to an embodiment of the present invention.

FIG. 3 shows one embodiment of a reserve charge authorization system flowchart 300 utilizing determination of a distance to a recharge point for authorizing use of battery reserve charge. In step 305, the method starts, such as when an electric vehicle has depleted the normally available charge of a battery for powering the electric vehicle. A notification may be displayed or otherwise communicated to a user that the battery of the vehicle can no longer power the vehicle using its normal or regular charge portion, but instead, a reserve charge portion of the battery may be utilized upon authorization via a remote device. A processor of the electric vehicle allows for communication between the electric vehicle and the remote device via an antenna coupled with the processor. At step 310, the processor receives a user input signal to begin a telematic link with the remote device. This signal may be received via a user input device, such as a button, electrically connected with the processor such that, upon user manipulation or interaction with the input device, the user input signal is sent to the processor. At step 315, the processor of the vehicle initiates a telematic link with the remote device using the antenna which allows for the transmitting or receiving of various data or signals. Thus, one or more antennas of the electric vehicle may communicate with one or more antennas of the remote device for facilitating such communications over the telematic link. In an alternative embodiment, the telematic link may be initiated automatically without user input, for example upon sensing substantial depletion of the battery of the vehicle. In still another embodiment, the telematic link may be initiated by the remote device.

At step 320, the processor of the electric vehicle determines a vehicle reserve charge level or amount of the reserve charge portion of the battery on the electric vehicle. This charge level or amount represents or otherwise corresponds to the amount of energy that the reserve charge portion of the battery has available. The charge level or amount may be determined directly by the processor or may be sensed or otherwise determined by any number of intermediate sensors or circuit components for transmittal to the processor. The charge level or amount is transmitted from the processor of the electric vehicle and received by a processor of the remote device in step 322 via the telematic link. The remote device may use the charge level or amount for determining whether to authorize reserve charge usage of the battery by the electric vehicle, as described in greater detail herein.

At step 323, the processor of the electric vehicle determines a geographic location of the electric vehicle and may interface with various navigational devices, for example, the vehicle positioning components 210 of FIG. 2A. In certain embodiments, the processor of the vehicle may be the same processor used as part of a navigation or mapping system on the electric vehicle. At step 324 and once the geographic location of the electric vehicle has been determined, that location data is transmitted from the processor of the electric vehicle and received by a processor of the remote device via the telematic link. Upon receipt of the location data, the remote device may use the location data for determining whether to authorize reserve charge usage by the electric vehicle, as described in greater detail herein.

At step 325, the processor of the remote device determines a nearby recharge point or location and the distance from the electric vehicle to such recharge point. The remote device may include a memory, the processor and the memory of the remote device being similar to or the same as the processor and memory previously described for the electric vehicle. Maps or addresses with known recharge locations (e.g., gas stations with electric vehicle connections, home addresses for the electric vehicle, etc.) may be stored in the memory of the remote device and accessible by the processor of the remote device. Thus, upon receipt of the vehicle location data by the processor of the remote device via the telematic link in step 324, the processor may lookup nearby recharge points or locations that are stored in the memory of the remote device. The processor of the remote device may determine a distance from the electric vehicle location to only the closest recharge point or may determine a plurality of distances from the electric vehicle location to a plurality of nearby recharge points.

In step 330, the processor of the remote device calculates or otherwise determines, based upon the charge level or amount data received in step 322, whether the electric vehicle would be able to travel from its current geographic location to the recharge point by using the available charge in the reserve charge portion of the battery of the electric vehicle. If one or more recharge points are located within the drivable range of the electric vehicle based on the available reserve charge level or amount, then operation continues to step 340, as described below. However, if the recharge points are located outside of the drivable range of the electric vehicle using reserve charge, then operation continues to step 335 and the electric vehicle will not be authorized to use the reserve charge portion of the battery for powering the electric vehicle. The telematic link may then be disconnected without the transmittal of any authorization signal. In certain embodiments, the remote device may be used to request or facilitate additional services for the electric vehicle, for example, requesting a tow truck or other emergency services be deployed to the vehicle location before the telematic link is terminated.

In step 340, the processor of the remote device transmits an authorization signal via the telematic link and is received by the processor of the electric vehicle. The authorization signal permits the electric vehicle to utilize the reserve charge portion of the battery of the electric vehicle for powering the electric vehicle. The authorization signal may be configured to authorize use of only a predetermined portion of the reserve charge portion of the battery. For example, if it is determined that the vehicle distance to the recharge point in step 325 is five miles, the authorization signal may be configured to authorize only a specific part or fraction of the reserve charge portion of the battery such that the vehicle can travel roughly five miles by using the reserve charge. This allows the electric vehicle sufficient charge to travel to the recharge point, but does not allow the vehicle to continue utilizing the reserve charge portion of the battery for distances substantially beyond the determined distance.

In step 350, an authorized reserve charge threshold is stored in the memory of the electric vehicle, corresponding to the predetermined portion of the reserve charge portion of the battery authorized for use by the authorization signal. The threshold represents the reserve charge portion permitted to be accessed and used by the electric vehicle. In an alternative embodiment, the authorization signal may permit unconditional access to the entire reserve charge portion of the battery for powering the electric vehicle. The authorized reserve charge threshold is reset in step 360 when the battery of the electric vehicle is plugged in or otherwise begins its recharge process. The reset may occur immediately upon plugging in the battery or at any predetermined point during its recharge process. Thus, after the electric vehicle concludes traveling to the recharge point and the battery begins recharging, the authorized reserve charge threshold is reset for blocking further use of the reserve charge portion of the battery for powering the electric vehicle until a subsequent authorization signal is received by the processor of the electric vehicle via a telematic link.

The various steps described for flowchart 300 may be performed or processed in alternative ordering. For example, a reserve charge authorization system may transmit/receive a geographic location of an electric vehicle before transmitting/receiving a reserve charge level or amount of a battery. In addition, certain steps of flowchart 300 may be omitted or new steps added. An alternative embodiment may also perform certain steps using the processor of the electric vehicle instead of the processor of the remote device or vice versa. For example, an electric vehicle may be equipped with a mapping or address system stored in a memory such that determinations of nearby recharge points and/or distances from the current geographic location of the electric vehicle to the recharge points may be conducted by the processor of the electric vehicle. The remote device may be configured to automatically perform any or all of the steps described in flowchart 300 or may be part of a system interacted with by other live personnel who aid in determining whether to authorize reserve charge usage.

The remote device may be included as part of a system for providing a variety of customer service functions, the authorization of reserve charge being only one of many such functions. For example, the system may provide navigational help, medical or other emergency assistance, or any of a variety of possible customer needs. Customer service personnel may interact with the remote system or the remote device and interact with a user of an electric vehicle via voiced communication over the telematic link. In an alternative embodiment, the customer service personnel may interact with a user of an electric vehicle by sending textual messages for display upon a screen or other display in the electric vehicle. In still another embodiment, the system may be entirely automated such that live customer service personnel are unnecessary for all or some of the customer service functions offered by the system.

Figure 4:
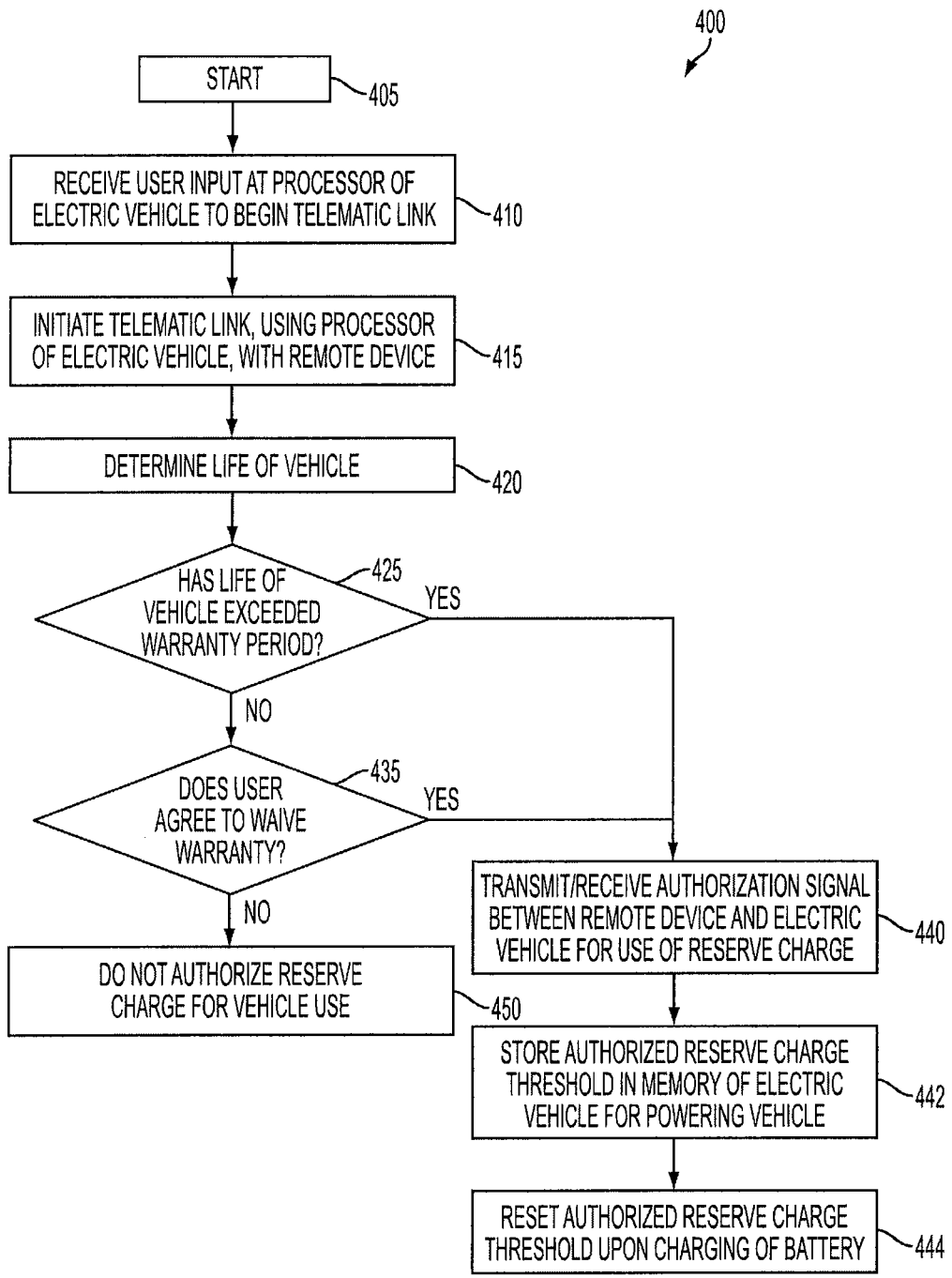
FIG. 4 is a logic flowchart for a reserve charge authorization system utilizing a determination of a life of a vehicle, according to an embodiment of the present invention.

FIG. 4 shows a reserve charge authorization system flowchart 400 utilizing a determination of a life of a vehicle, according to an embodiment of the present invention. Certain aspects of the flowchart 400 may be the same or similar to aspects of the flowchart 300, as discussed above for FIG. 3. For example, the reserve charge authorization system may utilize a first processor and a first memory of an electric vehicle and a second processor and a second memory of a remote device, the first processor and the second processor configured to interface via a telematic link, the same or similar to that discussed above for FIG. 3. Flowchart 400 is primarily distinguished in its determination of a life of the electric vehicle for warranty purposes in deciding whether to authorize use of the reserve charge portion of a battery for powering the electric vehicle. Various of the above features or aspects of flowchart 300 of FIG. 3 may be applicable in the same or similar form to flowchart 400 of FIG. 4.

In step 405, the method starts, the same or similar as previously described for step 305 of flowchart 300. In step 410, the processor receives a user input signal from a user of the electric vehicle to begin a telematic link with the remote device, the same or similar as previously described for step 310 of flowchart 300. At step 415, the processor of the electric vehicle initiates a telematic link with the remote device for allowing communication between the electric vehicle and the remote device, the same or similar as previously described for step 315 of flowchart 300.

In step 420, the reserve charge authorization system determines the current life of the electric vehicle or the battery of the electric vehicle. The life of the vehicle may be based upon passage of time since purchase of the electric vehicle or battery by the user or may be based upon use (e.g., the distance the electric vehicle has traveled since purchase, the amount of energy output by the battery since purchase, etc.). An alternative embodiment may use any desired measurement for the life of the electric vehicle or battery as it corresponds to a warranty, described in greater detail herein. The processor of the electric vehicle may determine the life of the vehicle or battery and subsequently transmit such information over the telematic link to the remote device or, alternatively, the remote device may determine the life of the vehicle or battery based on data stored in the memory of the remote device.

In step 425, the reserve charge authorization system determines whether the life of the vehicle or the battery has exceeded a corresponding warranty period of the warranty for the vehicle or the battery. Either the processor of the electric vehicle or the remote device, or an individual interfacing with the remote device, may make such determination. If the warranty period has been exceeded, then operation continues to step 440, as described in greater detail herein. However, if the warranty period has not been exceeded, then operation continues to step 435. In step 435, the reserve charge authorization system next determines whether the user of the electric vehicle agrees to waive all or a portion of the warranty.

The user may respond to a prompt that is displayed or otherwise communicated to the user by interfacing with an input device. The telematic link may provide for voiced communication between the user of the electric vehicle and an individual using the remote device via one or more microphones. In such circumstances, the user of the electric vehicle may agree to waive at least a portion of the warranty by simply providing a verbal authorization to the individual using the remote device. If the user of the electric vehicle does not agree to waive all or some of the warranty, then operation continues to step 450 and the electric vehicle is not authorized to use the reserve charge portion of the battery for providing power to the electric vehicle wheels.

However, if the warranty period has already been exceeded (as determined in step 425) or if the user agrees to waive at least a part of the warranty (as determined in step 435), in step 440, a processor of the remote device transmits an authorization signal via the telematic link that is received by the processor of the electric vehicle for permitting the electric vehicle to utilize the reserve charge portion of the battery, the same or similar as previously described for step 340 of flowchart 300. In step 442, an authorized reserve charge threshold is stored in the memory of the electric vehicle, corresponding to the predetermined portion of the reserve charge portion of the battery authorized for use by the authorization signal, the same or similar as previously described for step 350 of flowchart 300. In step 444, the authorized reserve charge threshold is reset in when the battery of the electric vehicle is plugged in or otherwise begins its recharge process, the same or similar as previously described for step 360 of flowchart 300.

Similar to flowchart 300, the various steps described for flowchart 400 may be performed or processed in alternative ordering or certain steps may be omitted or new steps added. Various of the steps may be performed using either the processor of the electric vehicle, the processor of the remote device, or by an individual interfacing with the remote device. The remote device may be configured to automatically perform any or all of the steps described in flowchart 400 or may be part of a system interacted on by other personnel who aid in determining whether to authorize reserve charge usage.

Figure 5:
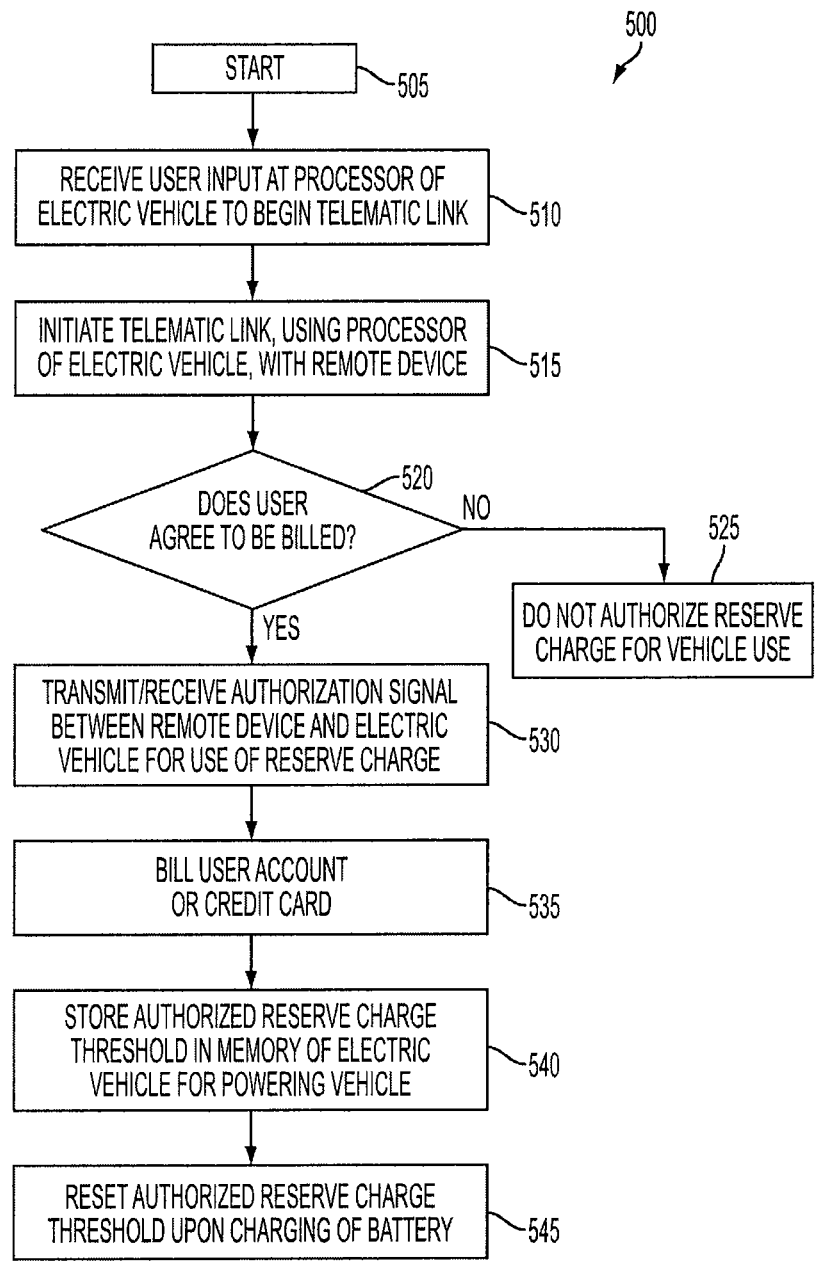
FIG. 5 is a logic flowchart for a reserve charge authorization system utilizing a billing of a user, according to an embodiment of the present invention.

FIG. 5 shows a reserve charge authorization system flowchart 500 utilizing a billing of a user, according to an embodiment of the present invention. Certain aspects of the flowchart 500 may be the same or similar to aspects of the flowcharts 300 or 400, as discussed above for FIG. 3 or 4. For example, the reserve charge authorization system may utilize a first processor and a first memory of an electric vehicle and a second processor and a second memory of a remote device, the first processor and the second processor configured to interface via a telematic link, the same or similar to that discussed above for FIG. 3. Flowchart 500 is primarily distinguished in its determination of a billing of a user in deciding whether to authorize use of the reserve charge portion of a battery for powering the electric vehicle. Various of the above features or aspects of flowcharts 300 or 400 of FIG. 3 or 4 may be applicable in the same or similar form to flowchart 500 of FIG. 5.

In step 505, the method starts, the same or similar as previously described for step 305 of flowchart 300. In step 510, the processor receives a user input signal from the user of the electric vehicle to begin a telematic link with the remote device, the same or similar as previously described for step 310 of flowchart 300. At step 515, the processor of the electric vehicle initiates a telematic link with the remote device using the antenna for allowing communication between the electric vehicle and the remote device, the same or similar as previously described for step 315 of flowchart 300.

In step 520, the reserve charge authorization system determines whether the user of the electric vehicle agrees to be billed for use of the reserve charge portion. Billing the user for use may be utilized as one means for preventing abuse of the authorization system or for helping recover costs associated with potential battery performance degradation through use of its reserve charge portion. The user may respond to a prompt that is displayed or otherwise communicated to the user by interfacing with a physical input device or agree to be billed via voiced communication over the telematic link, the same or similar as described for step 435 of flowchart 400. If the user of the electric vehicle does not agree to be billed, then operation continues to step 525 and the electric vehicle is not authorized to use the reserve charge portion of the battery for providing power.

However, if the user agrees to be billed then operation continues to step 530 and the processor of the remote device transmits an authorization signal via the telematic link and is received by the processor of the electric vehicle for permitting the electric vehicle to utilize the reserve charge portion of the battery, the same or similar as previously described for step 340 of flowchart 300. In step 535, a credit card or other account either corresponding to the user or the electric vehicle is billed for a predetermined payment amount. In step 540, an authorized reserve charge threshold is stored in the memory of the electric vehicle, corresponding to the predetermined portion of the reserve charge portion of the battery authorized for use by the authorization signal, the same or similar as previously described for step 350 of flowchart 300. In step 545, the authorized reserve charge threshold is reset when the battery of the electric vehicle is plugged in or otherwise begins its recharge process, the same or similar as previously described for step 360 of flowchart 300.

Similar to flowchart 300, the various steps described for flowchart 500 may be performed or processed in alternative ordering or certain steps may be omitted or new steps added. Various of the steps may be performed using either the processor of the electric vehicle, the processor of the remote device, or by an individual interfacing with the remote device. The remote device may be configured to automatically perform any or all of the steps described in flowchart 500 or may be part of a system interacted on by other personnel who aid in determining whether to authorize reserve charge usage.

Figure 6:
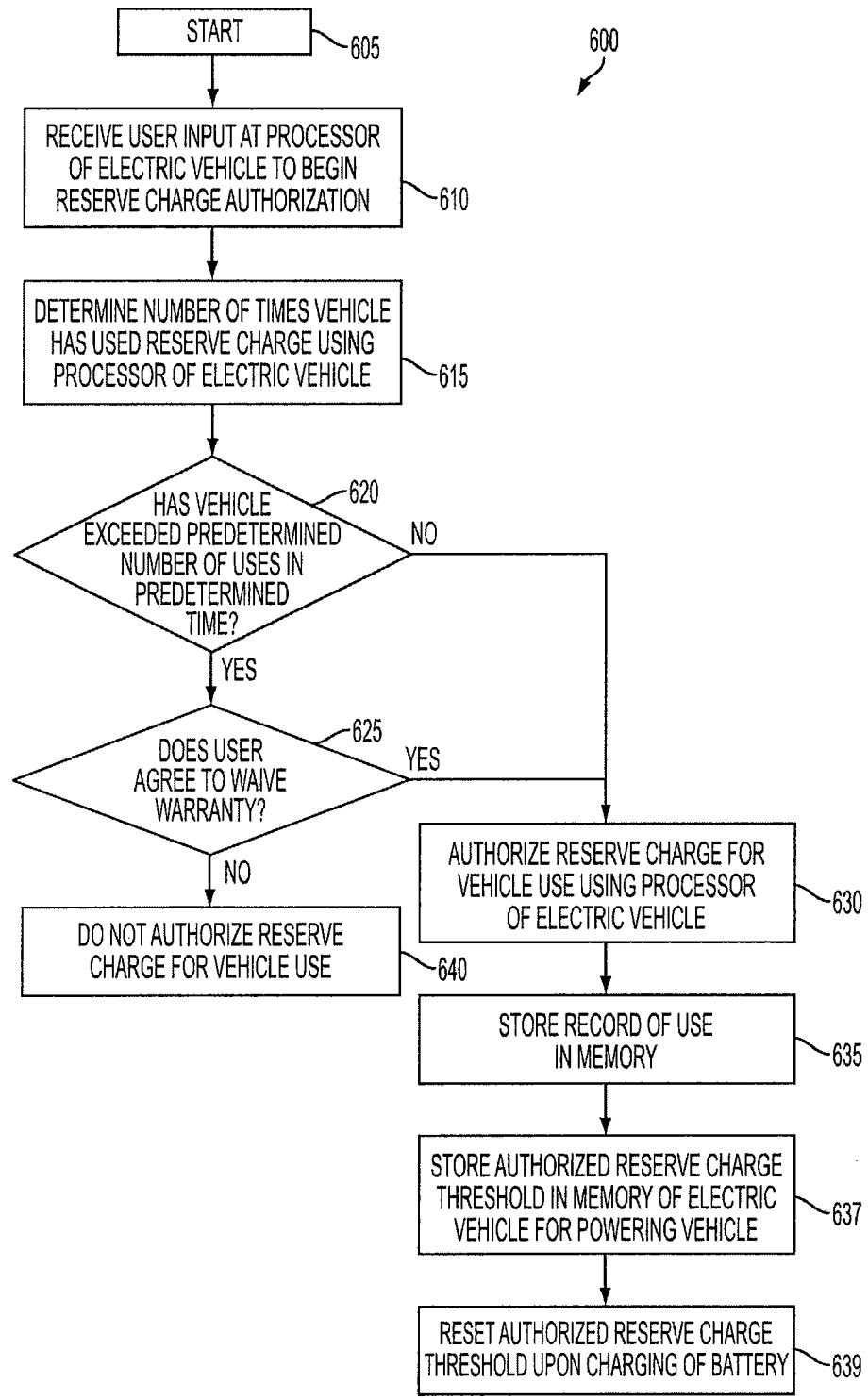
FIG. 6 is a logic flowchart for a reserve charge authorization system without a telematic link utilizing a number of times a vehicle has used a reserve charge, according to an embodiment of the present invention.

FIG. 6 shows a reserve charge authorization system flowchart 600 without a telematic link and utilizing a determination of a number of times a vehicle has used a reserve charge, according to an embodiment of the present invention. Certain aspects of the flowchart 600 may be the same or similar to aspects of the flowcharts 300, 400 or 500 as discussed above for FIG. 3, 4 or 5. Flowchart 600 is primarily distinguished in its determination of a number of times a vehicle has used a reserve charge and without requiring a telematic link in deciding whether to authorize use of the reserve charge portion of a battery for powering the electric vehicle. Various of the above features or aspects of flowcharts 300, 400 or 500 of FIG. 3, 4 or 5 may be applicable in the same or similar form to flowchart 600 of FIG. 6.

In step 605, the method starts, the same or similar as previously described for step 305 of flowchart 300. In step 610, a processor of the electric vehicle receives a user input signal to begin a process for authorizing use of a reserve charge portion of a battery of the electric vehicle for powering the vehicle. This signal may be received via a user input device, such as a button, electrically connected with the processor such that, upon user manipulation or interaction with the input device, a corresponding signal is sent to the processor. The authorizing process may be entirely local to the electric vehicle and thus without any need for communicating or otherwise interfacing with a remote device via a telematic link. In an alternative embodiment, however, the authorizing process may utilize a telematic link, the same or similar as previously described for flowcharts 300, 400 or 500.

At step 615, the processor of the electric vehicle determines a number of times the electric vehicle has previously used the reserve charge portion of the battery. This step may be performed by accessing a data value or data table stored in a memory electrically connected to the processor. The data value or data table may be updated every time the electric vehicle is authorized to use the reserve charge portion of the battery and thus maintains a record of the total number of times. In step 620, the processor of the electric vehicle determines whether the number of times the electric vehicle has previously used the reserve charge portion exceeds a predetermined number within a predetermined time period. In an alternative embodiment, no time period may be utilized, thus only the number of prior uses of the reserve charge portion need be determined. If the predetermined number has been exceeded, operation continues to step 625. If the predetermined number has not been exceeded, operation continues to step 630.

In step 625, the processor of the electric vehicle determines whether the user of the electric vehicle agrees to waive all or a portion of a warranty that may exist for the vehicle. If the electric vehicle is not currently under any warranty, then step 625 may be unnecessary. The user may respond to a prompt that is displayed or otherwise communicated to the user by manipulating or otherwise interfacing with an input device of the electric vehicle. If the user agrees to waive at least a part of the warranty, then operation continues to step 630. If the user does not agree to waive at least a part of the warranty, then operation continues to step 640 where the electric vehicle is not authorized use of a reserve charge portion of the battery.

In step 630, the processor of the electric vehicle authorizes the electric vehicle to utilize at least a part of the reserve charge portion of the battery for powering the electric vehicle. The authorization may allow use of only a predetermined portion of the reserve charge portion of the battery. In step 635, the data value or data table in memory is created or updated to indicate that the electric vehicle has been authorized to use at least a part of the reserve charge portion of the battery. Thus, the data value or data table maintains an updated record of the total number of times when the electric vehicle has been so authorized. In an alternative embodiment, other data may also be stored in the memory, such as the date, time, amount of reserve charge to be made available, etc. In step 637, an authorized reserve charge threshold is stored in the memory of the electric vehicle, corresponding to the predetermined portion of the reserve charge portion of the battery authorized for use, the same or similar as previously described for step 350 of flowchart 300. In step 639, the authorized reserve charge threshold is reset when the battery of the electric vehicle is plugged in or otherwise begins its recharge process, the same or similar as previously described for step 360 of flowchart 300. Similar to flowchart 300, the various steps described for flowchart 600 may be performed or processed in alternative ordering or certain steps may be omitted or new steps added.

Steps described for one embodiment of a reserve charge authorization system may additionally or alternatively be incorporated into any of the other embodiments. For example, the steps for determination of a distance from an electric vehicle to a recharge point, the same or similar as described for FIG. 3, may be used for determining whether to authorize use of a reserve charge portion of a battery in any other embodiments. Those of ordinary skill would also appreciate that the various illustrative logical blocks, modules, and algorithm steps described in connection with the examples disclosed herein may be implemented as electronic hardware, computer software, or combinations of both. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for authorizing use of battery reserve charge of an electric vehicle, the method comprising the steps of:
   providing a battery having a reserve charge portion for powering the electric vehicle only after an authorization signal is received, and a normal-use charge portion for powering the electric vehicle regardless of whether the authorization signal is received;
   setting, using a processor connected to the battery, a charge amount of the reserve charge portion that accounts for a loss of a maximum charge capacity of the battery;
   establishing, using the processor, a telematic link with a remote device;
   receiving, at the remote device and using the telematic link, the charge amount of the reserve charge portion of the battery and a location of the electric vehicle;
   authorizing, using the remote device, powering of the electric vehicle using at least a part of the reserve charge portion of the battery based on the received charge amount of the reserve charge portion of the battery and the location of the electric vehicle;

transmitting, from the remote device and using the telematic link, the authorization signal to the processor; and utilizing, using the processor, at least a part of the reserve charge portion of the battery to power the electric vehicle when or after the processor receives the authorization signal.

2. The method of claim 1 further comprising the steps of:
determining a location of a recharge point; and
determining a distance between the location of the electric vehicle and the location of the recharge point,
wherein the transmitting of the authorization signal is based on whether the charge amount of the reserve charge portion of the battery would allow the electric vehicle to travel a distance between the location of the electric vehicle and the location of the recharge point.

3. The method of claim 1 wherein the authorization signal is configured to authorize use of only a predetermined part of the reserve charge portion of the battery for powering the electric vehicle.

4. The method of claim 1 further comprising the step of determining whether the electric vehicle or the battery is under a warranty.

5. The method of claim 4 further comprising the step of determining whether a user of the electric vehicle agrees to waive at least a portion of the warranty before the transmitting of the authorization signal.

6. The method of claim 1 further comprising the step of determining a number of times the electric vehicle has previously been authorized use of the reserve charge portion of the battery for powering the electric vehicle.

7. The method of claim 1 further comprising the step of determining whether a user of the electric vehicle agrees to be billed before the transmitting of the authorization signal.

8. The method of claim 7 further comprising the step of billing a credit card or an account associated with the user or the electric vehicle.

9. A method for accessing battery reserve charge of an electric vehicle, the method comprising the steps of:
providing a battery having a reserve charge portion for powering the electric vehicle only after an authorization signal is received, and a normal-use charge portion for powering the electric vehicle regardless of whether the authorization signal is received;
setting, using a processor connected to the battery, a reserve charge level of the reserve charge portion;
initiating, using the processor, a telematic link with a remote device;
transmitting, using the telematic link, the reserve charge level from the processor to the remote device;
transmitting, using the telematic link, a location of the electric vehicle from the processor to the remote device;
authorizing, using the remote device, powering of the electric vehicle using at least a part of the reserve charge portion of the battery based on the received reserve charge level and the location of the electric vehicle;
receiving, using the telematic link, an authorization signal at the processor from the remote device; and
utilizing, using the processor, at least a part of the reserve charge portion of the battery to power the electric vehicle when or after the processor receives the authorization signal.

10. The method of claim 9 wherein the authorization signal is based on whether the reserve charge level of the battery would allow the electric vehicle to travel from the location of the electric vehicle to a recharge location.

11. The method of claim 9 further comprising the steps of:
providing a memory coupled to the processor; and
storing in the memory, in response to the receiving of the authorization signal, an authorized threshold of reserve charge of the battery for powering the electric vehicle.

12. The method of claim 11 further comprising the step of resetting the authorized threshold in the memory when the battery of the electric vehicle is at least partially recharged.

13. The method of claim 9 further comprising the step of transmitting, using the telematic link, a warranty waiver signal from the processor to the remote device, the warranty waiver signal representing a waiver of at least a portion of a warranty of the electric vehicle by a user of the electric vehicle.

14. The method of claim 9 further comprising the step of transmitting, using the telematic link, a billing approval signal from the processor to the remote device, the billing approval signal representing an approval by a user of the electric vehicle to be billed.

15. A system for accessing battery reserve charge of an electric vehicle comprising:
a rechargeable battery coupled to the electric vehicle, the battery configured to have:
a reserve charge portion for powering the electric vehicle only after an authorization signal is received, and
a normal-use charge portion for powering the electric vehicle regardless of whether the authorization signal is received;
a processor coupled to the battery and configured to:
set a charge amount of the reserve charge portion that accounts for a loss of a maximum charge capacity of the battery, and
determine a geographic location of the electric vehicle; and
at least one antenna coupled to the processor, the at least one antenna configured to:
transmit the charge amount of the reserve charge portion and the geographic location of the electric vehicle to a remote device,
receive an authorization signal from the remote device for authorizing use of at least a part of the reserve charge portion of the battery to provide power to the electric vehicle, the authorization signal being based on the received charge amount of the reserve charge portion and the geographic location of the electric vehicle, and
utilize at least a part of the reserve charge portion of the battery to power the electric vehicle when or after the processor receives the authorization signal.

16. The system of claim 15 wherein the authorization signal is based on a distance between the geographic location of the electric vehicle and a recharge point location.

17. The system of claim 15 further comprising a memory coupled to the processor, the memory configured to:
store a reserve charge threshold if the authorization signal is received from the remote device, and
reset the reserve charge threshold if at least a portion of the battery is recharged.

18. The system of claim 15 further comprising a user input device coupled to the processor for allowing a user to transmit a communication to the remote device via the at least one antenna.

19. The system of claim 18 wherein the communication is a warranty waiver signal.

20. The system of claim 18 wherein the communication is a billing approval signal.

* * * * *